Jan. 11, 1966 W. G. ROSE 3,228,661
SWIRL GENERATOR
Filed Jan. 21, 1964
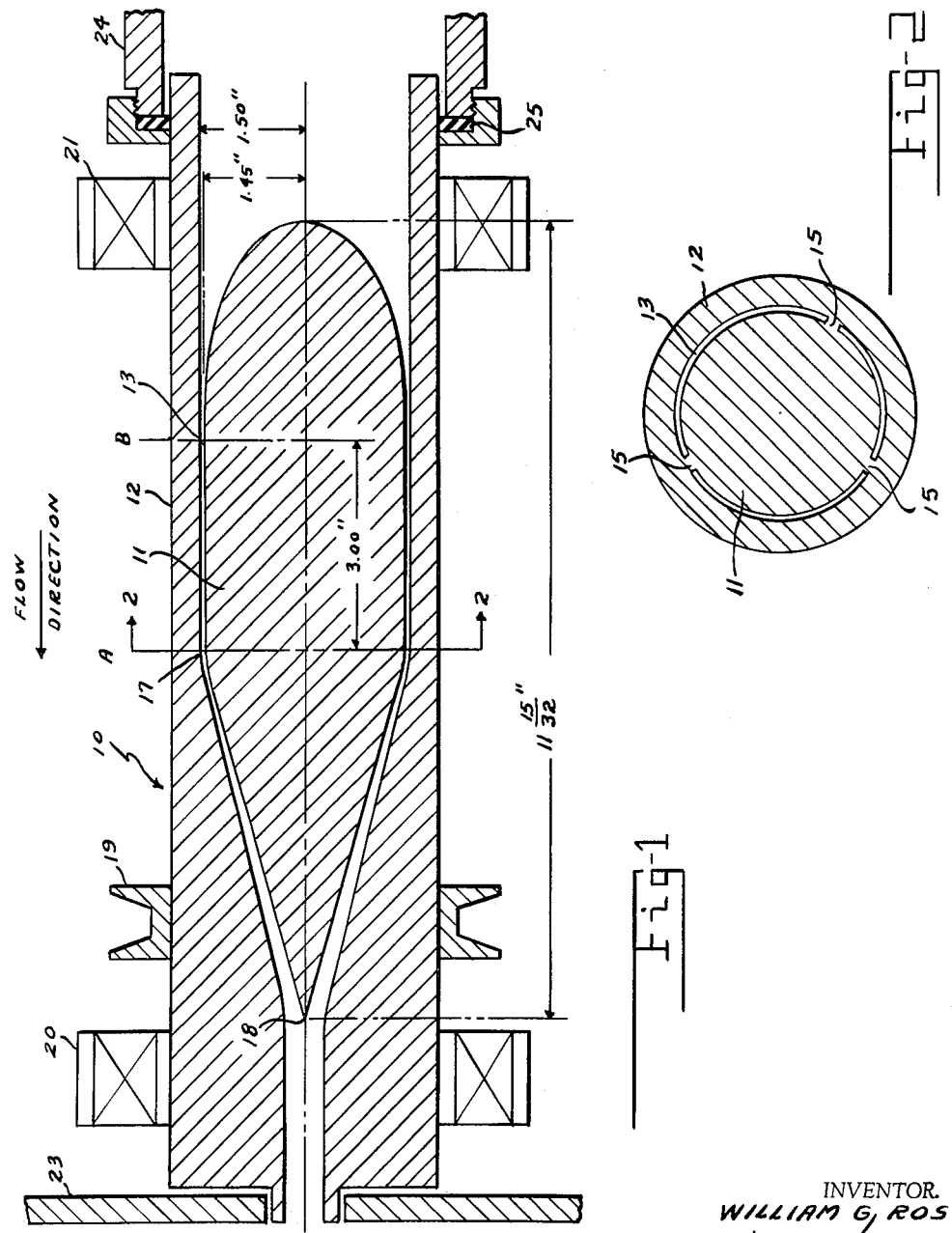
INVENTOR.
WILLIAM G. ROSE 3,228,661
SWIRL GENERATOR
William G. Rose, Baltimore, Md., assignor to the United States of America as represented by the Secretary of the Air Force
Filed Jan. 21, 1964, Ser. No. 339,311
2 Claims. (Cl. 259—3)

This invention relates to a device for providing a swirling jet of fluid.

One object of the invention is to provide a strongly swirling jet of fluid such as might be used in chemical mixing or liquid fuel burners.

Another object of the invention is to provide swirl velocities that are large compared to the through-flow velocities.

These and other objects will be more fully understood from the following detailed description taken with the drawing wherein FIG. 1 is a longitudinal cross-sectional view of a swirl generator according to the invention, and FIG. 2 shows a full sectional view of the device of FIG. 1 along the line 2—2.

Referring to FIG. 1 of the drawing, reference number 10 refers to a swirl generator having a solid central body core member 11 and an outer body member 12 separated by an annular passage 13. The inner body 11 is joined to the outer body 12 by means of radial spokes 15, as shown in FIG. 2. Two sets of three spokes, each spaced 120° apart, are located at the position shown at A and B in FIG. 1. The spacing between central body 11 and outer body 12 is increased between 17 and 18 so as to provide a substantially constant cross-sectional area of the space between the inner and outer bodies normal to the direction of flow. A pulley 19 surrounds and is secured to the outer body 12 so that the device may be driven with a V-belt, not shown. The device is supported for rotation by means of bearings shown schematically at 20 and 21. An end plate or wall, for the reservoir or chamber into which the fluid is discharged, is shown at 23. A seal may be provided between wall 23 and body member 12, if needed. The ducting for supplying fluid to the swirl generator is shown at 24. A seal 25 is provided between duct 24 and member 12. The particular ducting and seal used form no part of this invention. The dimensions shown on the drawing are merely representative and are not intended to be limiting as these dimensions would be different for other devices and would be determined by the particular application for the device.

In the operation of the device with the fluid flowing through the device in the direction indicated by the arrow so marked, the device is rotated by a V-belt connected to pulley 19 or by other drive means. The fluid entering the swirl generator 10 is turned away from the axis by the solid central body 11 and made to flow through the narrow annular passage 13. Since the central body 11 and outer body 12 rotate as a single unit, the fluid flowing through the narrow annular passage 13 is caused to rotate at the angular velocity of the unit by the viscous shear stresses in the fluid. When the fluid flow is turned in toward the axis between 17 and 18, its rotational velocity or swirl is increased due to conservation of angular momentum. It was found in a device tested that viscosity plays a dominant role in bringing the flow into solid-body rotation in the annular passage 13 and then assumes a subordinate role in the discharge, so that the fluid conserves its acquired angular momentum.

There is thus provided a device for producing a strongly swirling jet of fluid.

While certain specific embodiments have been described in detail, it is obvious that numerous changes may be made without departing from the general principle and scope of the invention.

I claim:

1. A device for producing a swirling jet of fluid comprising, a body member having a first annular section with a first inner diameter, a second annular section with a second smaller inner diameter and a third tapered section interconnecting said first section and said second section; means for supplying a fluid medium to one end of said body member adjacent said first section; a core member within said body adjacent said first and third sections thereof; said core being secured to said body member at a plurality of annularly spaced positions; means on said core member adjacent said fluid supply means for turning said fluid medium away from the axis of said annular member; said core member having means adjacent said third section of said body member for providing a substantially constant cross-sectional area space between said body member and said core member in the region of said third section; said core member having a central portion of constant diameter to thereby provide a narrow annular passage within said body member and means for rotating said body member and said core member with the same velocity and in the same direction to thereby impart an angular velocity to said fluid medium.

2. A device for imparting an angular velocity to a fluid comprising, a body member having a first annular section with a first inner diameter, a second annular section with a second smaller inner diameter and a third tapered section interconnecting said first section and said second section; means for supplying a fluid medium to said first annular section of said body member; a core member within said body member adjacent said first and third sections thereof; means for rigidly connecting said core member to said body member, whereby they are made to move as a unit; said core member having means adjacent said third section for providing a substantially constant cross-sectional area space between said body member and said core member in the region of said third section; said core member having a portion of constant diameter and another portion adjacent said supply means curved away from said body member and means for rotating said body and said core member to thereby impart an angular velocity to said fluid medium.

References Cited by the Examiner
UNITED STATES PATENTS

| | | | |
|---|---|---|---|
| 2,547,151 | 4/1951 | Braeseke | 259—3 X |
| 2,766,483 | 10/1956 | Stokes | 18—30 |

FOREIGN PATENTS

| | | |
|---|---|---|
| 815,286 | 6/1959 | Great Britain. |

IRVING BUNEVICH, *Primary Examiner.*
EVERETT W. KIRBY, *Examiner.*